United States Patent
Graham et al.

(10) Patent No.: US 11,472,402 B2
(45) Date of Patent: Oct. 18, 2022

(54) WORK TOOL COLLISION AVOIDANCE METHOD AND SYSTEM FOR A WORK MACHINE

(71) Applicant: DEERE & COMPANY, Moline, IL (US)

(72) Inventors: Brett S. Graham, Dubuque, IA (US); Michael G. Kean, Maquoketa, IA (US); Drew F. Harwell, Lake Ann, MI (US); Keith N. Chaston, Dubuque, IA (US); Amy K. Jones, Asbury, IA (US); Keith J. Lensing, Asbury, IA (US)

(73) Assignee: Deere & Company, Moline, IL (US)

( * ) Notice: Subject to any disclaimer, the term of this patent is extended or adjusted under 35 U.S.C. 154(b) by 249 days.

(21) Appl. No.: 16/856,717

(22) Filed: Apr. 23, 2020

(65) Prior Publication Data

US 2021/0331669 A1  Oct. 28, 2021

(51) Int. Cl.
  *B60W 30/00* (2006.01)
  *B60W 30/09* (2012.01)
  *B60W 30/095* (2012.01)

(52) U.S. Cl.
  CPC ........ *B60W 30/09* (2013.01); *B60W 30/0956* (2013.01); *B60W 2300/17* (2013.01); *B60W 2300/45* (2013.01); *B60W 2554/20* (2020.02); *B60W 2554/80* (2020.02)

(58) Field of Classification Search
  CPC ............. B60W 30/09; B60W 30/0956; B60W 2554/20; B60W 2554/80; B60W 2300/17; B60W 2300/45
  See application file for complete search history.

(56) References Cited

U.S. PATENT DOCUMENTS

| | | | |
|---|---|---|---|
| 7,233,853 B2 | 6/2007 | Hendron et al. | |
| 7,823,897 B2 | 11/2010 | Kelly et al. | |
| 7,984,574 B2 | 7/2011 | Pfohl et al. | |
| 8,398,176 B2 | 3/2013 | Haroldsen et al. | |
| 8,818,026 B2 | 8/2014 | Kiyohara et al. | |
| 9,457,841 B2 | 10/2016 | Smith et al. | |
| 9,989,636 B2 | 6/2018 | Sherlock | |
| 2008/0083578 A1 | 4/2008 | Kelly et al. | |
| 2016/0037707 A1 | 2/2016 | Bebemes et al. | |
| 2017/0118915 A1* | 5/2017 | Middelberg | A01D 41/1274 |
| 2018/0030687 A1 | 2/2018 | Fleischmann | |
| 2019/0101641 A1* | 4/2019 | Hogan | G01S 13/931 |
| 2019/0168776 A1* | 6/2019 | Imaizumi | B60W 50/14 |
| 2020/0041999 A1 | 2/2020 | Pfaff | |
| 2020/0315083 A1* | 10/2020 | Mei | A01B 69/00 |
| 2020/0319346 A1* | 10/2020 | Mei | B60K 31/0008 |
| 2021/0309248 A1* | 10/2021 | Choe | B60W 60/001 |

* cited by examiner

*Primary Examiner* — Russell Frejd
*Assistant Examiner* — Brittany Renee Peko

(57) ABSTRACT

A method and a system for avoiding collision of an object with a work tool coupled to a work machine. The method comprising generating an object signal by an object detector, monitoring the object signal in real-time by a processor, processing the object signal to detect an object at least partially buried in the ground surface, determining a distance between the object and a distance threshold, and sending by a controller a control signal to one or more of a machine control system and a work tool control system to modify one or more of a movement of the work tool or the work machine based on the object reaching the distance threshold.

18 Claims, 4 Drawing Sheets

WORK TOOL COLLISION AVOIDANCE METHOD AND SYSTEM FOR A WORK MACHINE

CROSS-REFERENCE TO RELATED APPLICATIONS

N/A

FIELD OF THE DISCLOSURE

The present disclosure relates to a work tool collision avoidance method and system for a work machine.

BACKGROUND

Identification of buried utilities, abandoned rail or streetcar lines, manholes, valves and other castings need to be undertaken prior to the start of a construction project. Solid buried, or partially buried obstructions encountered during operations, such as milling, can damage cutting tools, cutting tool holders, and cutting drums. Under particularly adverse situations, the drive mechanism of a work machine may be also become damaged. The associated down time, inconvenience to the public, and repair costs can be substantial.

For example, rotary tools such a cutting drums and trencher work tools are routinely employed by work machines such as skids steers for ripping up a work surface such as asphalt, pavement, concrete, soil, loose rock, etc. These cutting type work tools and often require necessary replacement upon wear.

One of the problems associated is the heavy reliance on experienced operators for surveillance prior to beginning and during work in the area. This can be especially complex in urban areas where a pre-existing area is re-worked. The surveillance may involve flagging utility lines and objects and may also identify components by marking it with spray paint, wherein the color identifies utility. Damage done to a work tool because of the potential negligence by an operator, may reduce productivity and increase costs associated with replacement for worn cutting tools or damaged utilities, lines, spigots, or manholes.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a system and method for a work tool collision avoidance for a work machine. The system comprises a frame, a boom arm coupled to the frame, an object detector, a work tool, a processor, and a controller. The object detector, coupled to one or more of the boom arm and the frame, may create an object signal. The object detector may be configured to detect an object around the work machine. The object detector may be oriented towards the ground surface along a direction of the path of travel of the work machine. The object detector may generate an object signal. The work tool may be coupled to one or more of the boom arm and the frame. The work tool may be moving. The processor may be communicatively coupled to the object detector to process the object signal. The processor may be configured to monitor the object signal in real-time to detect an object at least partially buried in the ground surface. The object may be in the path of travel of the work tool. The processor may determine a distance between the object and a distance threshold. The distance threshold may be a minimum distance from the work machine to avoid collision with the work tool. The controller may be communicatively coupled to the processor. The controller may send a control signal to one or more of a machine control system and a work tool control system to modify one or more of a movement of the work tool based on the object reaching the distance threshold, and a movement of the work machine based on the object reaching the distance threshold.

Modifying movement of the work tool may comprise one or more of modifying one or more of a pitch, roll, and yaw of the work tool; modifying a rotational speed of the work tool; modifying a vertical position of the work tool relative to the ground surface; modifying a depth of cut position of the work tool; and modifying a left-right position of the work tool, the left-right position of the work tool being perpendicular to the path of travel.

Modifying the movement of the work machine comprises one or more of modifying a speed of one or more of a left ground-engaging and a right ground-engaging mechanism of the work machine; pausing the work machine; modifying an acceleration of the work machine; and modifying a pitch of the boom arm.

The system may further comprise of one or more of a work tool identification sensor, and an operator selection switch. The work tool identification sensor, the operator selection switch, and object detector may identify a parameter of the work tool and set the distance threshold based on the parameter of the work tool. A parameter of the work tool may comprise one or more of a dimension of the work tool relative to the work machine, a function of the work tool, a load of the work tool, and a material makeup of the work tool.

Processing the object signal may comprise one or more of detecting a ground surface irregularity from an image derived from the object signal, comparing the ground surface irregularity to a plurality of synthesize images, recognizing the object based on the plurality of synthesized images, and defining a bounded area in the image around the detected ground surface irregularity. Processing the object signal may further comprise determining a ground speed of the work machine, and modifying one or more of the movement of the work tool and a timing of movement of the work machine based on the ground speed.

The object detector may comprise one or more of an RGB sensor, a lidar sensor, an FLIR sensor, and a camera.

The object detector may be one or more of forward facing and rear facing.

The object may be identifiable based on a distinguishing color.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
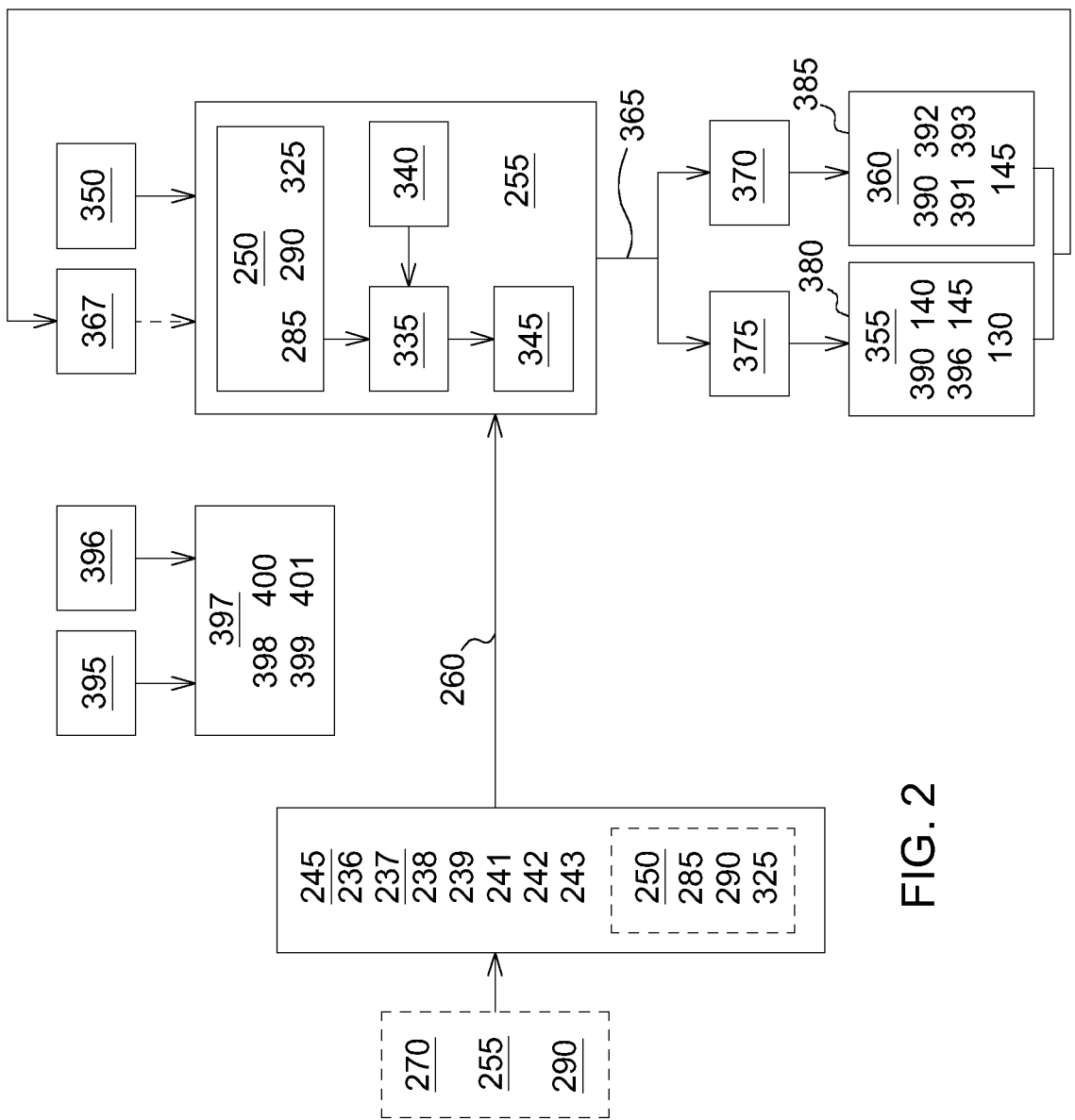
FIG. 2 is a schematic of the work tool collision avoidance system.

The term "processor" is illustrated as a single processor XXX in FIG. 2. However, two or more processors can be used according to particular needs, desires, or particular implementations of the controller and the described functionality. The processor may be a component of the controller, a portion of the object detector, or alternatively a part of another device. Generally, the processor can execute instructions and can manipulate data to perform the operations of the controller, including operations using algorithms, methods, functions, processes, flows, and procedures as described in the present disclosure.

Figure 1:
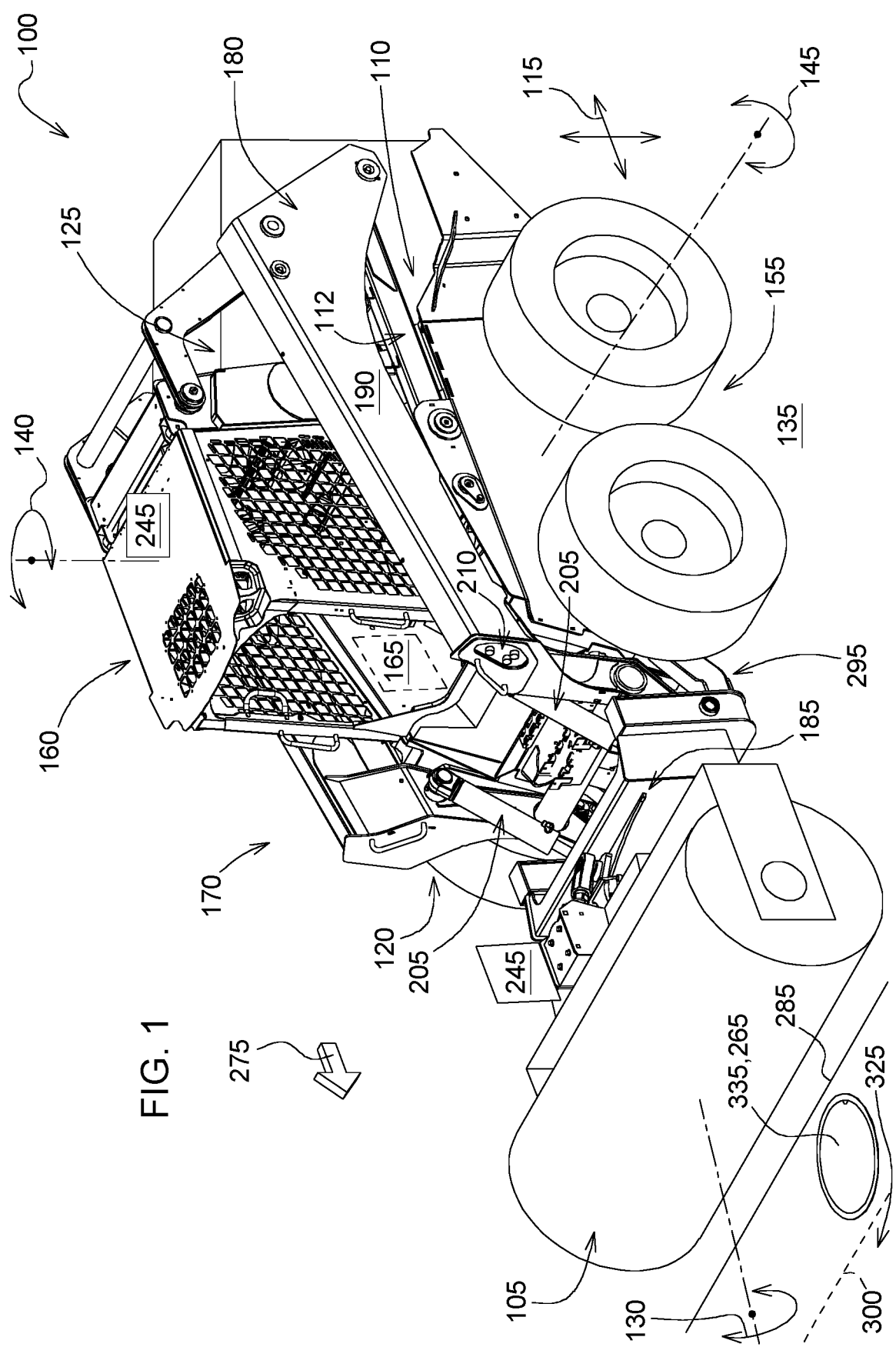
FIG. 1 is a perspective view of an exemplary embodiment of a work tool collision avoidance system on a skid steer.

FIG. 1 illustrates a work machine 100, extending in a fore-aft direction 115, depicted as a skid steer with a work tool 105 operatively coupled to the work machine 100. It should be understood, however, that the work machine 100 could be one of many types of work machines, including, and without limitation, a skid steer, a backhoe loader, a front loader, a bulldozer, a tractor, a baler, a sprayer, and other construction or agricultural vehicles. The work machine 100, as shown, has a frame 110, having a front-end section 120, or portion, and a rear-end portion 125. The work machine 100 includes a ground-engaging mechanism 155 that supports the frame 110 and an operator cab 160 supported on the frame 110. The ground-engaging mechanism 155 may be configured to support the frame 110 on a surface 135.

A power source 165 is coupled to the frame 110 and is operable to move the work machine 100. The illustrated work machine 100 includes wheels, but other embodiments may include one or more tracks that engage the surface 135. In this exemplary embodiment, the ground-engaging mechanism 155 on the left side of the work machine 100 may be operated at a different speed, or in a different direction, from the ground-engaging mechanism 155 on the right side of the work machine 100. In a conventional skid steer, the operator can manipulate controls from inside an operator cab 160 to drive the tracks on the right or left side of the work machine 100 using a control device such as a joystick, a foot pedal, a touchscreen, and a steering wheel. The movement for work machine 100 may be referred to as roll 130 or the roll direction, pitch 145 or the pitch direction, and yaw 140 or the yaw direction.

In the embodiment shown, the work machine 100 comprises a boom assembly 170 coupled to the frame 110. A work tool 105 (may also be referred to as work tool) may be pivotally coupled at a forward portion of the boom assembly 170, while a rear portion of the boom assembly 170 is pivotally coupled to the frame 110. The frame 110 comprises a mainframe 112 and a base frame for coupling the ground engaging mechanism 155. The work tool 105 may be coupled to the boom assembly 170 through a work tool coupler 185. One exemplary work tool coupler 185, often referred to as Deere and Company's Quik-Tatch, is an industry standard configuration and a coupler universally applicable to many Deere work tools and several aftermarket work tools.

The boom assembly 170 of the exemplary embodiment, comprises a first pair of boom arms 190 (one each on a left side and a right side) pivotally coupled to the frame 110 and moveable relative to the frame 110 by a pair of boom hydraulic actuators (not shown), wherein the pair of boom hydraulic actuators, may also be conventionally referred to as a pair of lift cylinders (one coupled to each boom arm) for a skid steer. The work tool coupler 185 may be coupled to a forward section, or portion, of the pair of boom arms 190, being moveable relative to the frame 110 by a pair of tilt hydraulic cylinders (not shown). The frame 110 of the work machine 100 further comprises a hydraulic coupler 210 on the front-end portion 120 of the work machine 100 to couple one or more auxiliary hydraulic cylinders to drive movement of or actuate auxiliary functions of the work tool 105. The hydraulic coupler 210, contrary to the work tool coupler 185, enables the hydraulic coupling of an auxiliary hydraulic actuators(s) on the work tool 105 to the hydraulic system 220 (shown in FIG. 2) of the work machine 100. Please note that not all work tools have one or more auxiliary hydraulic cylinders and therefore will not use the hydraulic coupler 210. Alternatively, uses for the hydraulic coupler 210 include opening or closing a grapple type work tool, spinning a rotary drum (shown in FIG. 1), or turning the cutting teeth on a trencher (shown in FIG. 3), to name a few. Each of the pair of boom hydraulic actuators, the pair of tilt hydraulic actuators, and the auxiliary actuators are double acting hydraulic actuators. As would be understood by one of ordinary skill in the art, one end of each actuator may be referred to as a head end, and the end of each actuator opposite the head end may be referred to as a rod end. Each of the head end and the rod end may be fixedly coupled to another component, such as a pin-bushing or pin-bearing coupling, to name but two examples of pivotal connections.

As a double acting hydraulic actuator, each may exert a force in the extending or retracting direction. Directing pressurized hydraulic fluid 235 into a head chamber of the actuators will tend to exert a force in the extending direction, while directing pressurized hydraulic fluid 235 into a rod chamber of the actuators will tend to exert a force in the retracting direction. The head chamber and the rod chamber may both be located within a barrel of the hydraulic actuator and may both be part of a larger cavity which is separated by a moveable piston connected to a rod of the hydraulic actuator. The volumes of each of the head chamber and the rod chamber change with movement of the piston, while movement of the piston results in extension or retraction of the hydraulic actuator. An object detector 245 may be coupled to one or more of the boom arm 190 and the frame 110, in a direction oriented towards the work tool 105.

Figure 3:
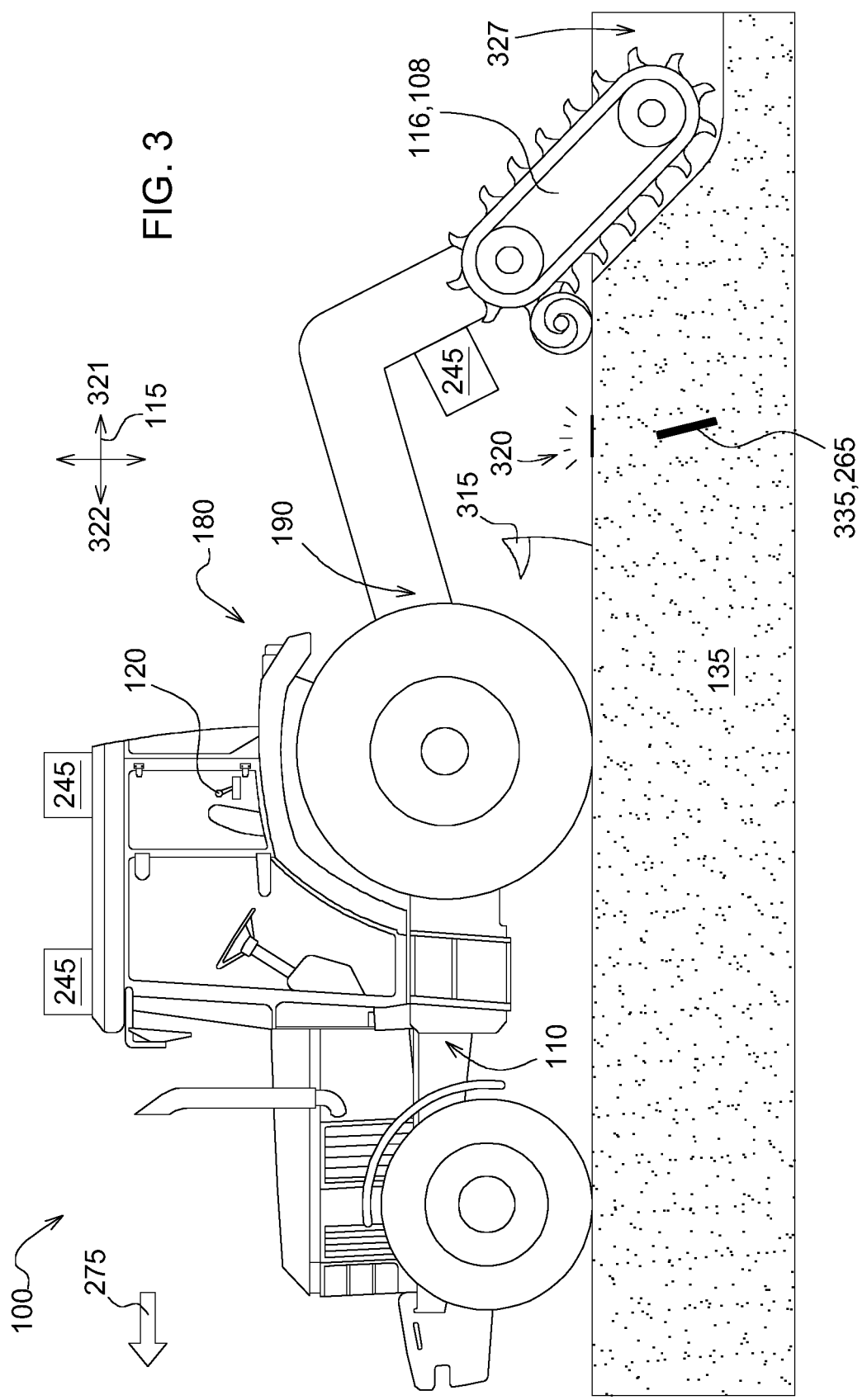
FIG. 3 is a side view of a second exemplary embodiment of a work tool collision avoidance system on a backhoe loader.

FIG. 3 demonstrates an alternative embodiment wherein the work machine is a backhoe loader. The system comprises a frame 110, a boom arm 190 (FIG. 1 demonstrates a pair of boom arms contrary to the single boom arm 190 of a compact track loader) coupled to the frame 110, an object detector 245, work tool 105, a processor 250, and a controller 255. Again, the object detector 245 may be coupled to one or more of the boom arm 190 and the frame 110, in a direction oriented towards the work tool 105. The object detector 245 may be configured to detect an object 265 around the work machine 100 (i.e. at minimum provide a sensed input 270 (shown in FIG. 2) to derive a detection of an object 265 when an object is present). The object detector 245 may be oriented towards the ground surface 135 along the direction of travel 275 of the work machine 100. As will be described in further detail later herein, the number and configuration of sensors used to detect the objects may be varied as needed or desired based on one or more parameters of the work tool. For example, the sensors may be positioned relative to each other so that an appropriate amount of sensitivity, accuracy and/or resolution may be provided between the sensors along an axial width or axial length of the work tool such that any object (underground and/or above ground) may be effectively detected. Exact placement of the object detectors 245 may vary depending on the work machine applied thereto.

Now turning to FIGS. 2 and 3, with continued reference to FIG. 1, FIG. 2 illustrates a work tool collision avoidance system 240 for the work machine 100. The object detector 245 may generate an object signal 260. The object detector 245 may give a line-of-sight to the ground surface 135 and objects around the work machine 100. The object detector 245 may be utilized to detect objects 265 within a certain detection distance 300 of the work machine 100. In one embodiment, the detection distance 300 may be determined by the capabilities of the object detector 245. The object detector 245 may comprise of a radar 236 to sense objects 265 located around the work machine 100 in the area, and other sensing technologies, including laser 237 (e.g. lidar), sound 238 (e.g. ultrasound/sonar), image capture 239 (e.g. one or more cameras), and FLIR thermal imaging systems 241. In normal operation, the object detector 245 may be configured to detect an object 265 closer than a threshold distance 285 from either the work machine 100 or the object detector 245 itself. The threshold distance 285 may be pre-set or adjustable to avoid the anticipated/known ground surface irregularities from setting off the object detector 245. Object detector 245 may also be configured to require a detected object 265 be larger than a threshold size 290 before being considered an object 265, and this threshold size 290 may be pre-set or adjustable, based on the distance to the object from a reference point 295. In one exemplary embodiment, the reference point 295 may be a portion of the work machine 100, such as the frame 110, the boom assembly 170, or the work tool 105. Alternatively, the reference point 295 may be a point where the ground-engaging mechanism 155 engages the ground surface 135. In yet another alternative embodiment, the reference point 255 may be the object detector 245 itself, or a receiving counterpart to the object detector 245.

Object detectors 245 may include a processor 250 (alternatively, the processor may be a part of the controller 255) that analyzes the sensed input 270 to determine whether an object 265 is present in the area and then communicates an object signal 260 indicative of the presence of an object 265 in the area to the controller 255. In one exemplary embodiment, the object signal 260 from the object detector 245 may be a value which indicates the absence of an object 265 (e.g. 0) or the proximity of the object to the object detector 245 (e.g. 1, 2, or 3 as the proximity increases). In alternative embodiments, the object signal 260 from the object detector 245 may not itself communicate the presence or absence of an object 265 in an area but may instead communicate a value representative of the signal strength. In another embodiment, the object signal 260 may be derived from the dimensional attributes of an image where a distance and/or size of an object may be calculated based on the known reference point 295 by the processor 250. In yet other alternative embodiments, the object detector 245 may communicate other data to controller 255, or data in an alternative format, to allow the controller 255 to determine whether an object 265 is present in the area. Object detector 245 may communicate further information such as the size of, distance to, or movement of the detected object, to enable the controller 255 to take different actions based on the size, distance, or movement of the detected object 265.

As previously mentioned, the work tool 105 may be coupled to one or more of the boom arm 190 and the frame 110. Within the application of the work tool collision avoidance system 240, the work tool 105 may be moving. For example, the rotary tool 305 shown in FIG. 1 is often coupled to a forward portion 120 of the work machine 100. Such cutting drums 305 (i.e. the rotary tool) are routinely employed by work machines such as backhoes, loaders, excavators, skid steers, and the like. The intended use of this type of work tool 100 (i.e. rotary drum 305) could be to cut asphalt, concrete or any other road construction/parking lot material. The work tool 100 could also be used for soil stabilization. It could be used for full depth reclamation of roads or alternatively a specified depth. The work associated with this type of tool can typically be slow moving, monotonous, and is generally performed in relatively straight lines, wherein an operator may easily lose their attention. The rotary tool 305 often uses cutting bits (not shown) adapted to perform this necessary work. These cutting bits often wear with use, requiring replacement upon wear or inadvertent damage from objects 265 unseen or unidentified by the operator. In one exemplary embodiment, the rotary tool 305 may hit a manhole, a utility, a pipeline, or a spigot, for example, and thereby damage either the object 265 encountered or become damaged wherein the teeth on the rotary tool 305 break.

In a second embodiment, FIG. 3, a trencher 310 is shown. The trencher 310, generally used to cut narrow trenches for pipe laying, is often coupled to the rear portion 180 of a work machine 100 such as the backhoe, thereby orienting the operator in the opposite direction of the work tool 105. Underground utilities are generally flagged 315, marked with spray paint 320, or some other means prior to work performed. Furthermore, utilities are often color coded. Commonly, the standard utility code followed by the American Public Works Association is outlined as follows: red for electric power lines; yellow for gas, oil, and steam; orange for telephone and cable television; blue for water; purple for reclaimed water; and green for sewer and storm drains. As discussed in further detail below, the system 240 may utilize color to identify an object based on color. Again, depending on the type of application, the object detector 245 comprising of one or more of an RGB sensor 242, a lidar sensor 243, a FLIR sensor 241, and an image capture system 239 (e.g. a camera) with color being one parameter of several other parameters, including shape, material, relative position, and distance. Often working in reverse of the direction the operator may be facing, (i.e. the operator may have to turn their head to see the work performed behind them while looking forward during maneuvering the direction of the work machine) trencher 310 may inadvertently encounter an unflagged utility (i.e. the ground surface irregularity 335, or object 265) as the trencher 310 encroaches the trench. Depending on the application of the work tool collision avoidance system 240, the object detector 245 may be one or more of forward facing 321 and rear facing 322.

A processor 250 may be communicatively coupled to the object detector 245 to process the object signal 260. The processor 250 may be configured to monitor the object signal 260 in real-time to detect an object 265 at least partially buried in the ground surface 135. The object 265 may be in the path of travel 325 of the work tool 105 (i.e. the trencher 310 for this embodiment). The processor 250 may determine a distance between the object 265 and a distance threshold 330, wherein the distance threshold 330 is the minimum distance from the work machine 100 to avoid collision with the work tool 105. Processing of the object signal 260 may comprise one or more of detecting a ground surface irregularity 335 from an image derived from the object signal 260, comparing the ground surface irregularity 335 to a plurality of synthesized images 340, recognizing the object 265 based on the plurality of synthesized images 340, and defining a bounded area 345 in the image around the detected ground surface irregularity 335. Processing the object signal 260 may further comprise of determining the ground speed 350 of the work machine 100 and modifying, based on the ground speed 350, one or more of the timing of the movement work tool 355, and timing of movement of the work machine 360. This will also include incorporating the current state/parameters 367 of both the work machine 100 and the work tool.

The controller 255 may be communicatively coupled to the processor 250 wherein the controller 255 sends a control signal 365 to one or more of a machine control system 370 and the work tool control system 375 to modify one or more of the movement of the work tool 380 and movement of the work machine 385 based on the object 265 reaching the distance threshold 330. The work tool 105 may be powered by the work machine 100 and thereby controlled by the machine control system 370, or it may be self-powered with an engine or electric power and controlled through the work tool control system 375. The work tool 105 may be moved by an combination of hydraulic actuators described above. In the exemplary embodiment of the skid steer shown in FIG. 1, the work tool 105 may be moved by boom hydraulic actuators, tilt hydraulic actuators, and auxiliary hydraulic actuators.

Modifying the movement of the work machine 385 comprises one or more of several work machine parameters 390. The first is modifying a speed 391 of one or more of the left ground-engaging mechanism and the right ground-engaging mechanism of the work machine 100. The relative motions of both the left ground-engaging mechanism and the right ground-engaging mechanism can also be indicative of the degree of a change in direction of the work machine. Another may include pausing the work machine 392, thereby halting potential collision. Another may include modifying an acceleration 393 of the work machine 100. In the first embodiment of a skid steer, the work machine 100 may also modify the pitch 145 of the boom arms 190.

Modifying the movement of the work tool 380 comprises one or more of several other parameters 390 including pausing movement of the work tool 376, and modifying the roll 130, yaw 140, and pitch 145, to name a few.

The system 240 may further comprise of a work tool identification sensor 395 and/or an operator selection switch 396. The work tool identification sensor 395, the operator selection switch 395, and the object detector 245 may be used to identify a parameter of the work tool 397, enabling the controller 255 to set the distance threshold 330 based on a parameter of the work tool 397. A parameter of the work tool 397 may include one or more of the following: a dimension of the work tool 398 relative to the work machine 100, a function 399 of the work tool, a load 400 of the work tool, and a material makeup 401 of the work tool. Provided the multitude of original equipment manufacturer and after market component work tools available, the system may identify a parameter 397 such as the dimensions of the work tool relative to the frame of the work machine. A load of the work tool may allow a work machine to calculate the hydraulic or electric forces requires for the above-mentioned movement modifications and for setting the distance threshold. The material makeup 401 and the function 399 of the work tool may enable the controller 255 to identify which objects may potentially damage work machine 100. Each of the parameters of the work tool 397 enable the controller 255 to provide input to the control signal 365 for collision avoidance. The operator selection switch 395 provides a manual means of inputting work tool identification information.

Figure 4:
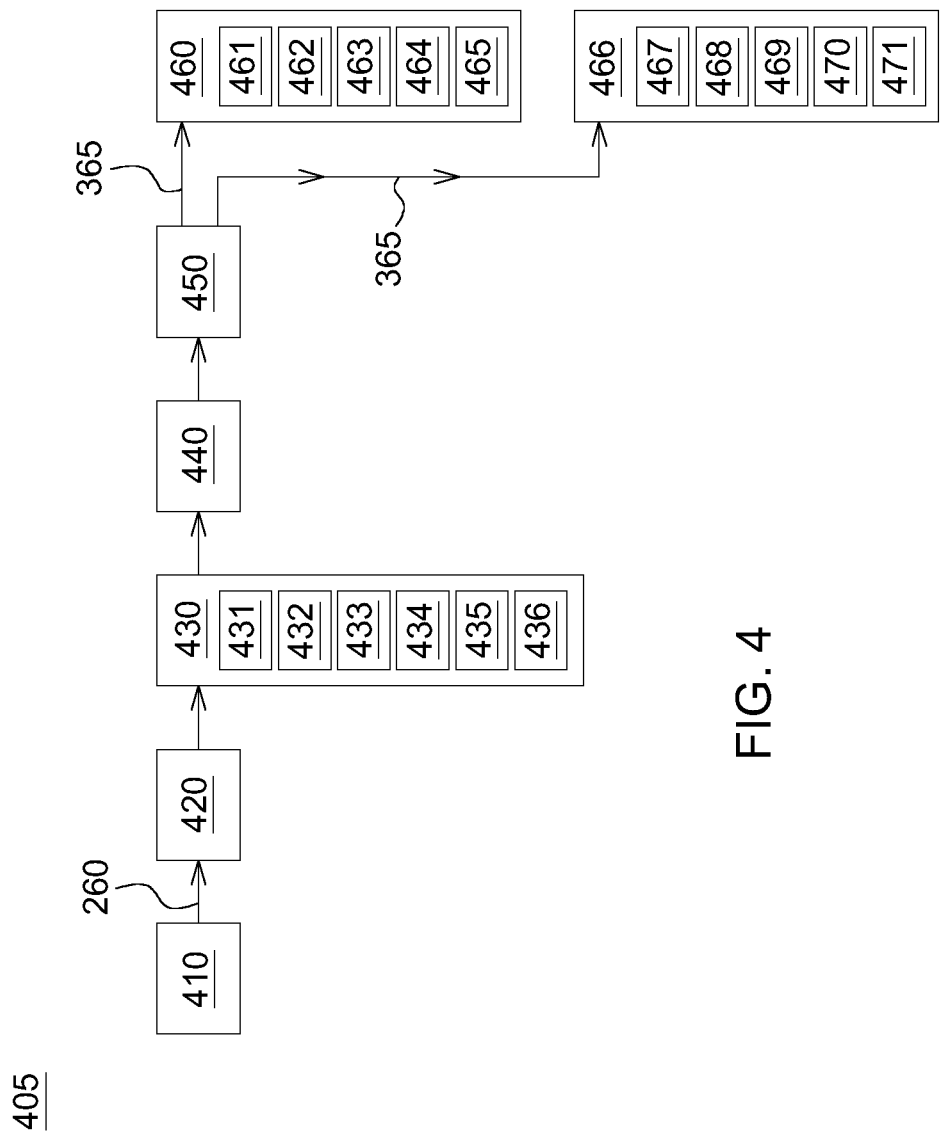
FIG. 4 is a flowchart disclosing the method for avoiding objects with a work tool coupled to a work machine.

From an industrial application perspective, FIG. 4 illustrates a method of avoiding objects with a work tool coupled to a work machine 405. The method 405, which may be implemented in one or more of the embodiments shown herein and depicted in the various FIGURES but are not limited to only these exemplary embodiments. At step 410, the method starts with generating an object signal 260 by an object detector 245.

At step 420, a processor monitors the object signal 260 in real-time wherein the object detector is communicatively coupled to the object detector 245.

At step 430, one or more of the controller 255 and the processor 250 may process the object signal 260 to detect an object at least partially buried in the ground surface 135, wherein the object may be in the path of travel 325 of the work tool 105. Processing the object signal 260 may comprise of detecting a ground surface irregularity from an image derived from the object signal (431), comparing the ground surface irregularity to a plurality of synthesized images (432), recognizing the object based on the plurality synthesized images (433), and defining a bounded area in the image around the detected ground surface irregularity (434). Processing the object signal 260 may further comprise determining a ground speed of the work machine (435), and modifying, based on the ground speed, one or more of a timing of the movement of the work tool and a timing of the movement of the work machine (436).

At step 440, one or more of the processor 250 and the controller 255 may determine detected distance 300 between the object and a distance threshold 330 wherein the distance threshold 330 is the minimum distance from the work machine 100 in the path of travel 325 to avoid collision with the work tool 105.

At step 450, the controller 255, communicatively coupled to the processor 250, may send a control signal 365 to one or more of a machine control system 370 and a work tool control system 375 to modify one or more of the following; at step 460, a movement of the work tool 380 based on the object reaching the distance threshold 330 and; and step 466, a movement of the work machine 385 based on the object reaching the distance threshold 330. At step 460, modifying movement of the work tool 380 may comprise one or more of the following; modifying one or more of a pitch 145, roll 130, and yaw 140 of the work tool 105 (461); modifying a rotational speed of the work tool (462); modifying a vertical position of the work tool relative to the ground surface (463); modifying a depth of cut position of the work tool (464); and modifying a left-right position of the work tool wherein the left-right position of the work tool being perpendicular to the path of travel (465). At step 466, modifying the movement of the work machine 385 may comprise one or more of the following; modifying a speed of one or more of a left ground-engaging mechanism and a right ground-engaging mechanism of the work machine (467); pausing the work machine (468); modifying an acceleration of the work machine (469); and modifying a pitch of the boom arms (470).

At step 460, one or more of a work tool identification sensor 395, an operator selection switch 396, and an object detector 245 may be used to identify a parameter of the work tool 397 to set the distance threshold 330 based on the parameter of the work tool 397. The parameter of the work tool 397 may comprise one or more of a dimension of the work tool 398 relative to the work machine, a function of the work tool 399, a load of the work tool 400, and a material makeup of the work tool 401.

In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is controlling the movement of the plunger independently of the movement of the crank arm. Another technical effect of one or more of the example embodiments disclosed herein is the ability to perform slower compression rates of the crop material via the plunger within the compression chamber. Another technical effect of one or more of the example embodiments disclosed herein is the ability to maintain the plunger in the compressed position for a longer period of time during a harvesting machine operation, for example during the binding operation.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A method for avoiding collision an object with a work tool coupled to a work machine, the method comprising:
  generating an object signal by an object detector,
    the object detector configured to detect the object around the work machine,
    the object detector coupled to one or more of a boom arm and the frame of the work machine;
    the object detector oriented towards a ground surface along a direction of a path of travel of the work machine;
    the work machine traveling along the path of travel on the ground surface, the work tool moving;
  monitoring the object signal in real-time by a processor, the processor communicatively coupled to the object detector;
  processing the object signal to detect an object at least partially buried in the ground surface, the object in the path of travel of the work tool, wherein processing the object signal comprises detecting a ground surface irregularity from an image derived from the object signal; comparing the ground surface irregularity to a plurality of synthesized images; recognizing the object based on the plurality of synthesized images; and defining a bounded area in the image around the detected ground surface irregularity;
  determining a distance between the object and a distance threshold, the distance threshold being a minimum distance from the work machine in the path of travel to avoid collision with the work tool; and
  sending by a controller, the controller communicatively coupled to the processor, a control signal to one or more of a machine control system and a work tool control system to modify one or more of:
  a movement of the work tool based on the object reaching the distance threshold and,
  a movement of the work machine based on the object reaching the distance threshold.

2. The method of claim 1, wherein modifying the movement of the work tool comprises one or more of:
  modifying one or more of a pitch, roll, and yaw of the work tool;
  modifying a rotational speed of the work tool;
  modifying a vertical position of the work tool relative to the ground surface;
  modifying a depth of cut position of the work tool; and
  modifying a left-right position of the work tool, the left-right position of the work tool being perpendicular to the path of travel.

3. The method of claim 1, wherein modifying the movement of the work machine comprises one or more of:

modifying a speed of one or more of a left ground-engaging mechanism and a right ground-engaging mechanism of the work machine;
pausing the work machine;
modifying an acceleration of the work machine; and
modifying a pitch of the boom arms.

4. The method of claim 1, further comprising:
identifying a parameter of the work tool by one or more of a work tool identification sensor, an operator selection switch, the object detector, and
setting the distance threshold based on the parameter of the work tool.

5. The method of claim 4, wherein the parameter of the work tool comprises one or more of a dimension of the work tool relative to the work machine, a function of the work tool, a load of the work tool, and a material makeup of the work tool.

6. The method of claim 1, wherein processing the object signal comprises:
determining a ground speed of the work machine, and
modifying, based on the ground speed, one or more of a timing of the movement of the work tool and a timing of movement of the work machine.

7. The method of claim 1, wherein the object detector comprises one or more of an RGB sensor, a lidar sensor, an FLIR sensor, and a camera.

8. The method of claim 1, wherein the object detectors are one or more of forward facing and rear facing.

9. The method of claim 1, wherein the object is identifiable by the processor based on a distinguishing color.

10. A work tool collision avoidance system for a work machine, the work machine traveling along a path of travel on a ground surface, the system comprising:
a frame;
a boom arm coupled to the frame;
an object detector coupled to one or more of the boom arm and the frame, the object detector creating an object signal, the object detector configured to detect an object around the work machine, the object detector oriented towards the ground surface along a direction of the path of travel of the work machine, the object detector generating an object signal;
a work tool coupled to one or more of the boom arm and the frame, the work tool moving;
a processor communicatively coupled to the object detector to process the object signal, the processor configured to monitor the object signal in real-time to detect an object at least partially buried in the ground surface, the object in the path of travel of the work tool, the processor determining a distance between the object and a distance threshold, the distance threshold being a minimum distance from the work machine to avoid collision with the work tool,
wherein processing the object signal comprises detecting a ground surface irregularity from an image derived from the object signal, comparing the ground surface irregularity to a plurality of synthesized images, recognizing the object based on the plurality of synthesized images, and defining a bounded area in the image around the detected ground surface irregularity; and
a controller communicatively coupled to the processor, the controller sending a control signal to one or more of a machine control system and a work tool control system to modify one or more of:
a movement of the work tool based on the object reaching the distance threshold, and
a movement of the work machine based on the object reaching the distance threshold.

11. The work tool collision avoidance system of claim 10, wherein modifying the movement of the work tool comprises one or more of:
modifying one or more of a pitch, roll, and yaw of the work tool;
modifying a rotational speed of the work tool;
modifying a vertical position of the work tool relative to the ground surface;
modifying a depth of cut position of the work tool; and
modifying a left-right position of the work tool, the left-right position of the work tool being perpendicular to the path of travel.

12. The work tool collision avoidance system of claim 10, wherein modifying the movement of the work machine comprises one or more of:
modifying a speed of one or more of a left ground-engaging and a right ground-engaging mechanism of the work machine;
pausing the work machine;
modifying an acceleration of the work machine; and
modifying a pitch of the boom arm.

13. The work tool collision avoidance system of claim 10 further comprising one or more of a work tool identification sensor, and an operator selection switch,
the one or more of the work tool identification sensor, the operator selection switch, and the object detector, identifying a parameter of the work tool and setting the distance threshold based on the parameter of the work tool.

14. The work tool collision avoidance system of claim 13, wherein the parameter of the work tool comprises one or more of a dimension of the work tool relative to the work machine, a function of the work tool, a load of the work tool, and a material makeup of the work tool.

15. The work tool collision avoidance system of claim 10, wherein processing the object signal further comprises:
determining a ground speed of the work machine, and
modifying, based on the ground speed, one or more of a timing of movement of the work tool and a timing of movement of the work machine.

16. The work tool collision avoidance system of claim 10, wherein the object detector comprises one or more of an RGB sensor, a lidar sensor, an FLIR sensor, and a camera.

17. The work tool collision avoidance system of claim 10, wherein the object detector is one or more of forward facing and rear facing.

18. The work tool collision avoidance system of claim 10, wherein the object is identifiable by the processor based on a distinguishing color.

* * * * *